United States Patent [19]
Johnson

[11] Patent Number: 5,207,364
[45] Date of Patent: May 4, 1993

[54] SHOULDER PROTECTION DEVICE FOR LADDER TRANSPORT

[76] Inventor: Douglas W. Johnson, 1241 Oceanview Rd., Charleston, S.C. 29412

[21] Appl. No.: 928,792

[22] Filed: Aug. 12, 1992

[51] Int. Cl.⁵ .............................................. B65G 7/00
[52] U.S. Cl. ................................... 224/264; 224/265; 224/270; 224/907
[58] Field of Search ............... 224/255, 264, 265, 266, 224/270, 907

[56] References Cited
U.S. PATENT DOCUMENTS

| | | | |
|---|---|---|---|
| 3,788,308 | 1/1974 | Simpson | 224/264 X |
| 4,474,386 | 10/1984 | Kanemaki | 224/265 |
| 4,854,801 | 8/1989 | Sameniego | 224/264 |
| 5,058,789 | 10/1991 | Piper | 224/265 |

*Primary Examiner*—Renee S. Luebke
*Attorney, Agent, or Firm*—Shefte, Pinckney & Sawyer

[57] ABSTRACT

A shoulder protection device releasably mountable within the U-shaped channels of a ladder to provide support during shoulder supported transportation thereof, including a mounting arrangement for releasably mounting the device within the U-shaped channel of a ladder, a recess formed in the device to accommodate ladders having a pivotably mounted cross-brace and a shim assembly for permitting the device to be mounted on ladders having various U-shaped channel depths and various cross-brace constructions. The device may also include a strip that will protect the clothing of the user of the device, a tether and/or storage arrangement for holding the device to the ladder.

17 Claims, 6 Drawing Sheets

SHOULDER PROTECTION DEVICE FOR LADDER TRANSPORT

BACKGROUND OF THE INVENTION

The present invention relates broadly to support and protection devices for use when carrying objects on a person's shoulder and, more particularly, to a shoulder protection device for use when carrying a ladder.

Virtually everyone has carried a ladder at one time or another and to do so most people balance the ladder on their shoulder with an arm extending between two rungs or other support members thereof. Advantageously, most people position the ladder so that it is balanced front to back on their shoulder, but the weight of the ladder and the edges of the portion of the ladder which rest on the shoulder can result in significant discomfort, particularly when the ladder must be carried for a long term period.

More specifically, many ladders are constructed with U-shaped channels functioning as the upstanding members with rungs extending therebetween. As is known, conventional extension ladders may include parallel sets of upstanding members slidably mounted to one another. Conventional folding stepladders have upstanding members pivotably mounted to a single platform at one end thereof which form an inverted V-shape when unfolded. A pivotal cross-brace extends between the upstanding members to stabilize the stepladder when unfolded. Further, each type of ladder may include rung braces which are fitted to the underside of the ladder rung and the inside of the legs of the ladder. Both types of ladders may include the aforesaid U-shaped channels which provide two narrow edges which must support the entire weight of the ladder in contact with the shoulder of a person carrying the ladder. Accordingly, the ladder can "dig-in" to the carrier's shoulder causing discomfort and creating a hazard to nearby objects when the carrier tries to adjust the ladder on his shoulder for a more comfortable fit and the portions of the ladder extending beyond the carrier are suddenly shifted.

These problems can be compounded when the carrier of a ladder is a carpenter, fireman or other individual who often carries a ladder in his work. For these individuals, physical distress induced by the repeated carrying of ladders in the above-mentioned fashion may include bruises, pinched nerves, and lacerations, not to mention soiled and/or ripped clothing.

Accordingly, there exists a need for a device which will provide a comfortable, smooth, and stable surface at the shoulder contact area when carrying a ladder on one's shoulder, and which may be used on either an extension ladder or a stepladder.

SUMMARY OF THE INVENTION

It is accordingly an object of the present invention to provide a shoulder protection device for ladder transport which deals with the aforementioned problems. Specifically, it is an object of the present invention to provide a shoulder protection device which is releasably mounted to a ladder, such as a ladder having legs formed of generally U-shaped channels, to provide support during shoulder supported transportation thereof. It is further an object of the present invention to provide a shoulder protection device which may be used on an extension ladder or a stepladder and which provides protection for the garments of the ladder carrier.

The shoulder protection device of the present invention is primarily adapted for being releasably mounted in the U-shaped channel of the ladder with a cushioned portion projecting beyond the edges of the U-shaped channel to provide a cushioned support to protect a user's shoulder and enhance the ease and comfort associated with transporting a ladder. Basically, the shoulder support device comprises a body configured for mounting insertion within the U-shaped channel, the body having a first surface for mounting contact with the U-shaped channel, a second surface projecting beyond the edges of the U-shaped channel for contact with the shoulder of the user, a mounting arrangement affixed to the first surface for releasably mounting the device within the U-shaped channel, and a recess formed in the first surface extending transversely across the width of the U-shaped channel when the device is mounted therein for mounting the device in the U-shaped channels of ladders having a pivoted cross-brace construction, the recess being of sufficient depth to accommodate the cross-brace and associated hardware. The present invention also includes a plurality of shim assemblies of graduated thicknesses for selectively mounting at spaced locations between the first surface of the body and the U-shaped channel for forming a variable recess therebetween and increasing the depth of the device to permit mounting the device on ladders having U-shaped channels of different depths and to ensure that a portion of the second surface projects beyond the edges of the U-shaped channel and to vary the depth of the recess to accommodate cross-brace constructions of various sizes.

The present invention preferably includes a garment protection arrangement attached to the body and projecting outwardly therefrom and formed to extend intermediate the clothing of the user and a rung on the ladder being carried to prevent the user's clothing from becoming soiled or torn due to contact with the ladder rung. In addition, the present invention may include a tether arrangement fixed to the body of the device and releasably mountable to the ladder to prevent the device from becoming disassociated with the ladder when the device is not disposed within the U-shaped channel, the tether arrangement preferably being an elongate flexible strand. The present invention may further include a storage arrangement attached to the ladder outside the U-shaped channel and cooperative with the mounting arrangement for securing the device in a position outside the U-shaped channel for storage of the device when the device is not disposed in the U-shaped channel, such as when the ladder is in use.

Preferably, the mounting arrangement includes at least one mounting member projecting outwardly from the recess and a fastener arrangement affixed to the mounting member for releasably mounting the device in the U-shaped channel. It is preferred that the fastener arrangement include a two portion hook and loop fastener, known in the marketplace as Velcro ®, having a first portion attached to the mounting member and a second portion attached to the U-shaped channel, thereby allowing the device to be releasably mounted within the U-shaped channel. Further, the shoulder protection device may include a recess formed in at least one mounting member adjacent the fastener arrangement and extending in a generally parallel orientation with the body for accommodation of rung braces and mounting hardware associated therewith. Velcro ® is the subject of various federal trademark registrations owned by Velcro Industries B.V. of Amsterdam, the Netherlands.

DESCRIPTION OF THE PREFERRED EMBODIMENT

Figure 1:
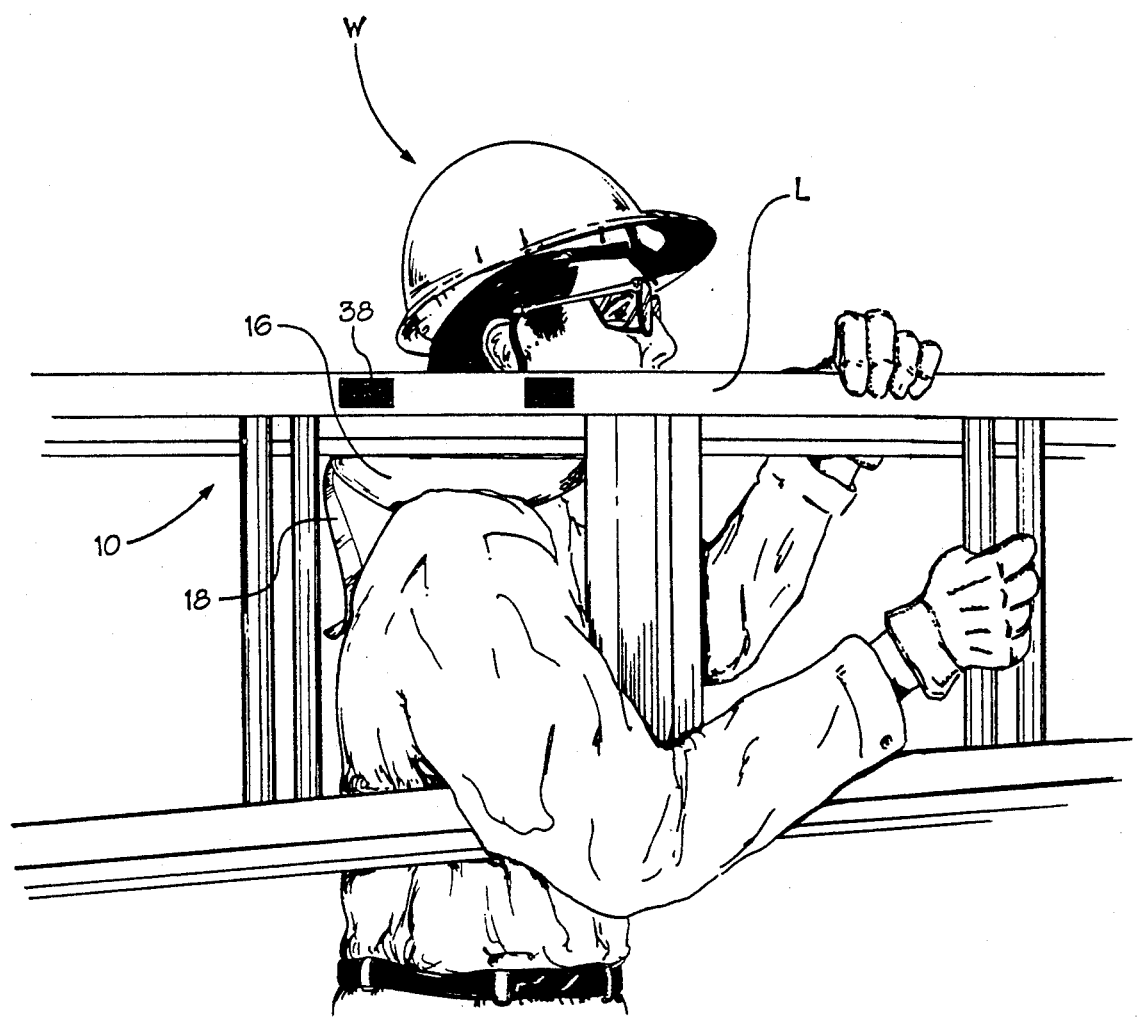
FIG. 1 is a perspective view of a shoulder protection device for ladder support according to the preferred embodiment of the present invention illustrated in its preferred manner of use in carrying ladders.

Referring now to the accompanying drawings, and initially to FIG. 1, a shoulder protection device for ladder support according to the preferred embodiment of the present invention is indicated generally at 10 and is illustrated in its preferred manner of use supporting a ladder L on the shoulder of a workman W as the ladder is being carried thereby. Preferably, the device may include a lower surface formed as cushioned shoulder pad 16 providing a surface for resting the ladder on the user's shoulder, and a protection strap 18 is preferably disposed intermediate the back of the workman W and portions of the ladder L.

Figure 2:
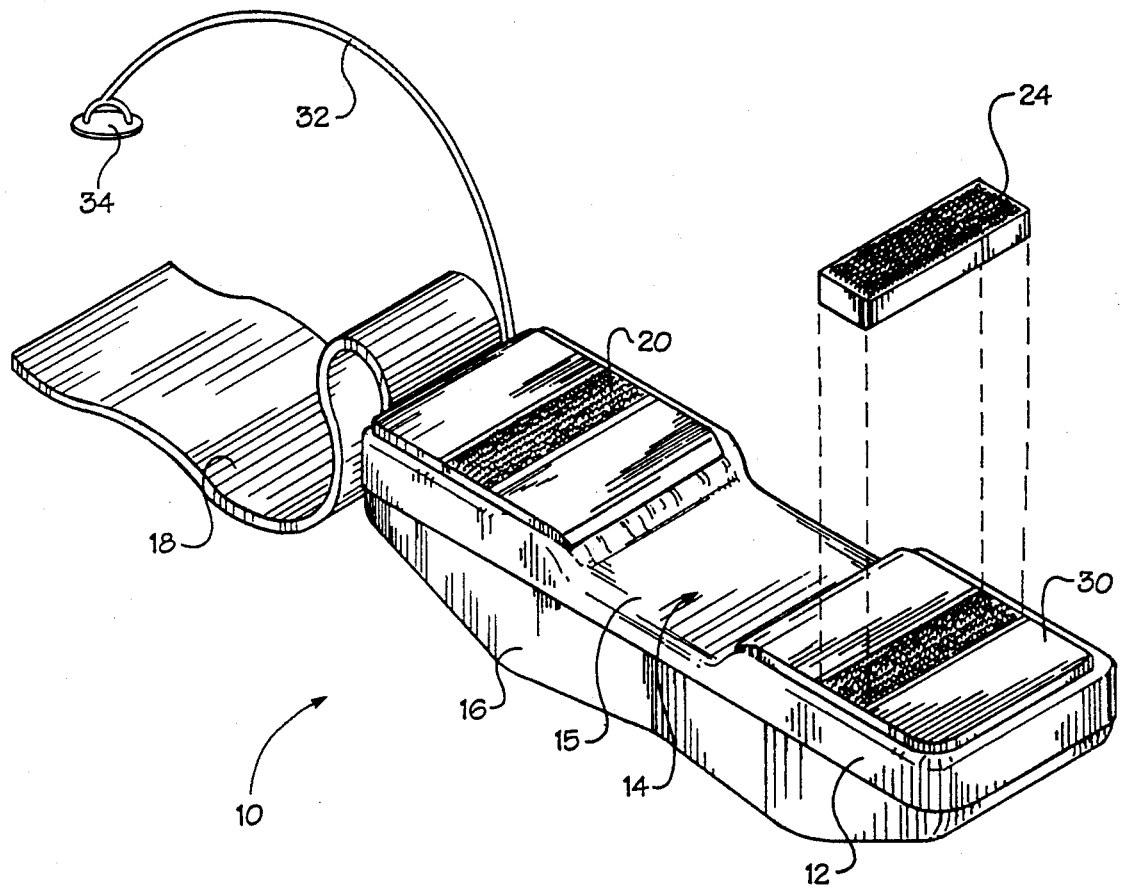
FIG. 2 is a perspective view of the shoulder protection device illustrated in FIG. 1 according to the preferred embodiment of the present invention.

With reference to FIG. 2, the shoulder protection device for ladder support of the present invention includes a generally rectangular body 12 having an upper surface 15 formed with two mounting members 30 with a recess 14 therebetween which extends transversely across the width of the body 12. By extending the recess 14 across the width of the body 12, the device 10 can be mounted on either U-shaped channel 28 of a ladder L, regardless of which direction the cross brace is configured to extend. By the above, the device 10 may be mounted on ladders by either right-handed or left-handed people according to their respective natural tendencies of orientation. Additionally, a cushioned pad 16 projects outwardly from the body portion 16 as shown in the accompanying drawings to form a second lower surface for engaging the shoulder. The cushioned pad 16 may be contoured to provide a comfortable surface for contact with the user's shoulder and to enhance the stability of the ladder being carried. A well 19 is formed in the upper surface of each mounting member 30 for insertion of a first portion 20 of a Velcro ® hook and loop fastener which is inserted therein, providing a substantially flush mounting contact between the mounting members 30 and the inner surface of the U-shaped channel 28. A second portion 22 of the Velcro ® fastener (see FIGS. 3 and 4) is attached to the inner surface of the U-shaped channel 28.

To enhance the capability of mounting the device 10 on various ladders having U-shaped channels with different depths, shims 24 are provided for mounting between the mounting members 30 and the inner surface of the U-shaped channel 28. The shims 24 are generally rectangular blocks of variable thicknesses having Velcro ® portions attached to the upper and lower surfaces thereof for mounting engagement with the U-shaped channel 28 and the mounting members 30 of the device 10, respectively, as will be explained in greater detail presently. While a single shim 24 of singular thickness is shown in FIG. 2, for clarity, it should be understood that in the preferred embodiment of the present invention, at least two shims 24 are preferred and other shims 24 contemplated for use with the present invention may be of greater or lesser thicknesses as required.

The aforesaid garment protection strap 18 projects outwardly from the rear portion of the body 12 and is preferably a thin band of rubber which is sufficiently flexible to hang downwardly from the ladder carrying device 10 and be suspended intermediate the shoulder of a user and a ladder being carried as illustrated in FIG. 1 to prevent the user's clothing from becoming soiled or torn due to contact with portions of a ladder being carried.

A tether 32 is provided which is preferably an elongate strand that projects outwardly from the body 12 and terminates in a mounting ring 34 which is fixable to the ladder by a two-piece Velcro ® fastener 36 to prevent the device 10 from becoming disassociated with the ladder when the device 10 is not disposed within the U-shaped channel of the ladder.

Figure 3:
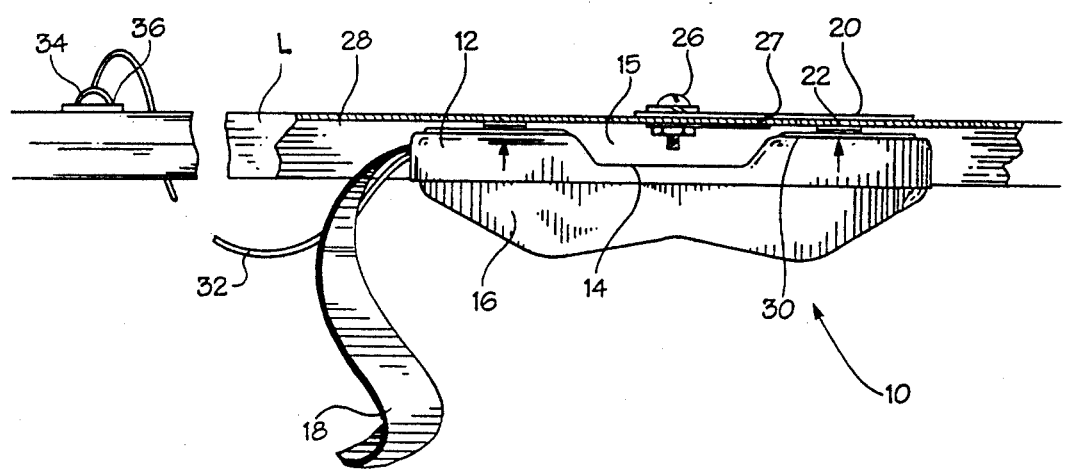
FIG. 3 is a side view of the shoulder protection device mounted in the U-shaped channel of a ladder.

Typically, ladders are carried on the shoulder with shoulder contact occurring near a natural balance point of the ladder in which approximately half of the weight of the ladder is in front of the user's shoulder and approximately half of the weight is behind the user's shoulder. For a stepladder this position usually coincides with the mounting location of the aforesaid pivotably mounted cross-brace of the ladder. As seen in FIG. 3, a cross-brace 27 is pivotably mounted to the U-shaped channel 28 of a ladder L using a conventional nut, bolt and washer assembly 26.

With continued reference to FIG. 3, according to the preferred method of mounting the device 10 in the U-shaped channel 28 of a ladder L, and as previously described, the first portion 20 of a two portion Velcro ® fastener is attached to the mounting member 30 with the second portion 22 of the Velcro ® fastener mounted to the inner surface of the U-shaped channel 28. The mounting positions are indicated in FIG. 3 by arrows. The device 10 is positioned in the U-shaped channel 28 with the two Velcro ® portions 20, 22 in mating contact, and it will be noted that the associated nut, bolt and washer assembly 26 of the ladder L is disposed within the recess 14 formed between the mounting members 30 so that the device 10 is mounted evenly within the U-shaped channel 28 notwithstanding the projecting hardware of the ladder itself.

The protection strap 18 is allowed to hang loosely from the device 10 to extend between the clothing of a user and a portion of the ladder L. The cushioned pad 16 projects outwardly from the body 12 beyond the edges of the U-shaped channel 28 for resting the ladder on a user's shoulder without contact between the channel edges and the user's shoulder. The tether line 32 also projects outwardly from the body 12 and is attached to the ladder L on the outer surface of the U-shaped channel 28 utilizing the above-described two portion Velcro ® fastener 36. A storage arrangement including Velcro ® portions 38 may be attached to the outer surface of the U-shaped channel 28 (see FIG. 1) for retaining the device 10 in place when the ladder is being used, the Velcro ® portions 38 having a form and spacing similar to the above-described Velcro ® portions 22. These additional Velcro ® portions are configured to mate with the Velcro ® portions 20 attached to the mounting members 30.

Figure 4:
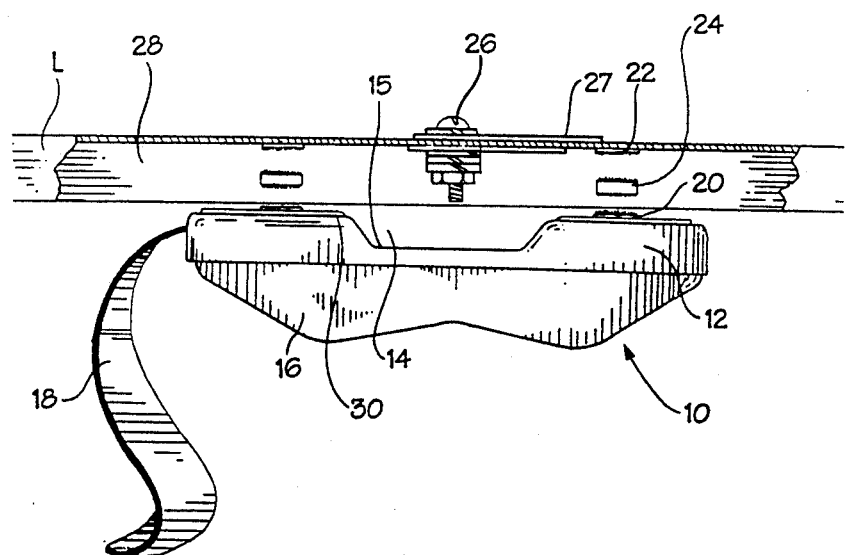
FIG. 4 is a side view of the shoulder protection device of the present invention illustrating the use of the shim assembly when mounting the device in the U-shaped channel of a ladder.

Referring now to FIG. 4, an alternate method of mounting the device 10 within a U-shaped channel 28 of a ladder L is illustrated. If the cross-brace mounting bolts 26 extend farther into the U-shaped channel 28 than will be accommodated by the recess 14, or if the edges of the U-shaped channel project beyond the useful thickness of the cushioned pad 16, shims 24 may be placed intermediate the first portion 20 of the Velcro ® fastener attached to the mounting member 30 and the second portion 22 of the Velcro ® fastener attached to the U-shaped channel 28 to increase the depth of the recess 14. The Velcro ® fastener portions on the shims 24 are mountingly engaged with the Velcro ® portions on the ladder and the device 10. While FIG. 4 illustrates shims 24 of a singular thickness, other shims of other thicknesses may be used to provide the necessary clearance for either the cross-brace and its associated nut, bolt and washer assembly 26 or to increase the overall depth or thickness of the device 10 to ensure that a portion of the cushioned pad 16 projects beyond the edges of the U shaped channel 28 sufficiently to prevent shoulder contact with the edges of the U-shaped channel 28. In addition, while the tether 32 is not illustrated in FIG. 4, it should be understood that use of the shims 24 will not affect use of the tether 32.

Figure 5:
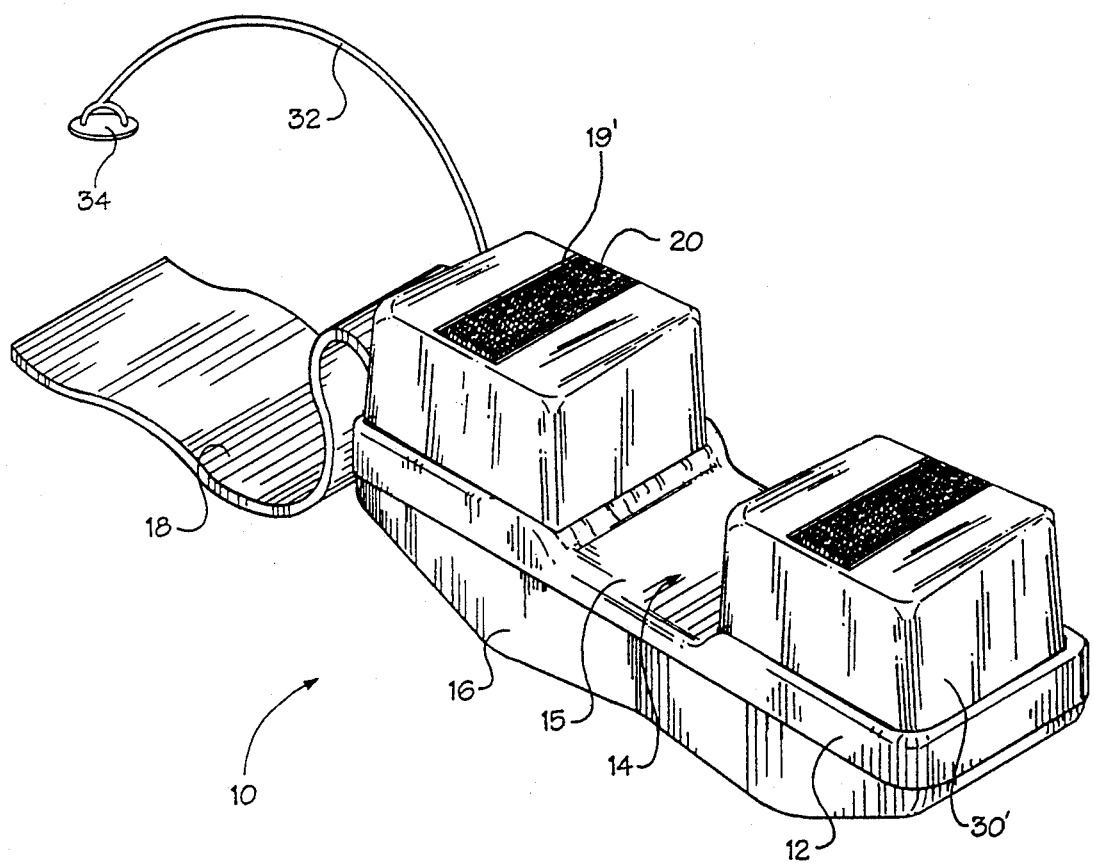
FIG. 5 is a perspective view of the shoulder protection device of the present invention according to an alternate embodiment thereof.

Referring now to FIG. 5, an alternative embodiment of the shoulder protection device for ladder support of the present invention is illustrated. For installations requiring a recess of known increased depth, the ladder carrying device 10 of the present invention may be formed with mounting members 30' that are of increased height, thereby providing a recess having a predetermined increased depth. As previously described, a well 19' is formed in the upper surface of the mounting member 30' for insertion of a first portion of a Velcro ® hook and loop fastener to provide substantially flush contact between the mounting member 30' and the inner surface of the U-shaped channel 28. Use of the aforesaid garment protection strap 18 and the tether 32 is not affected by the larger mounting members 30'. Mounting the device 10 in the U-shaped channel 28 of a ladder L is performed in the manner previously described.

Figure 6:
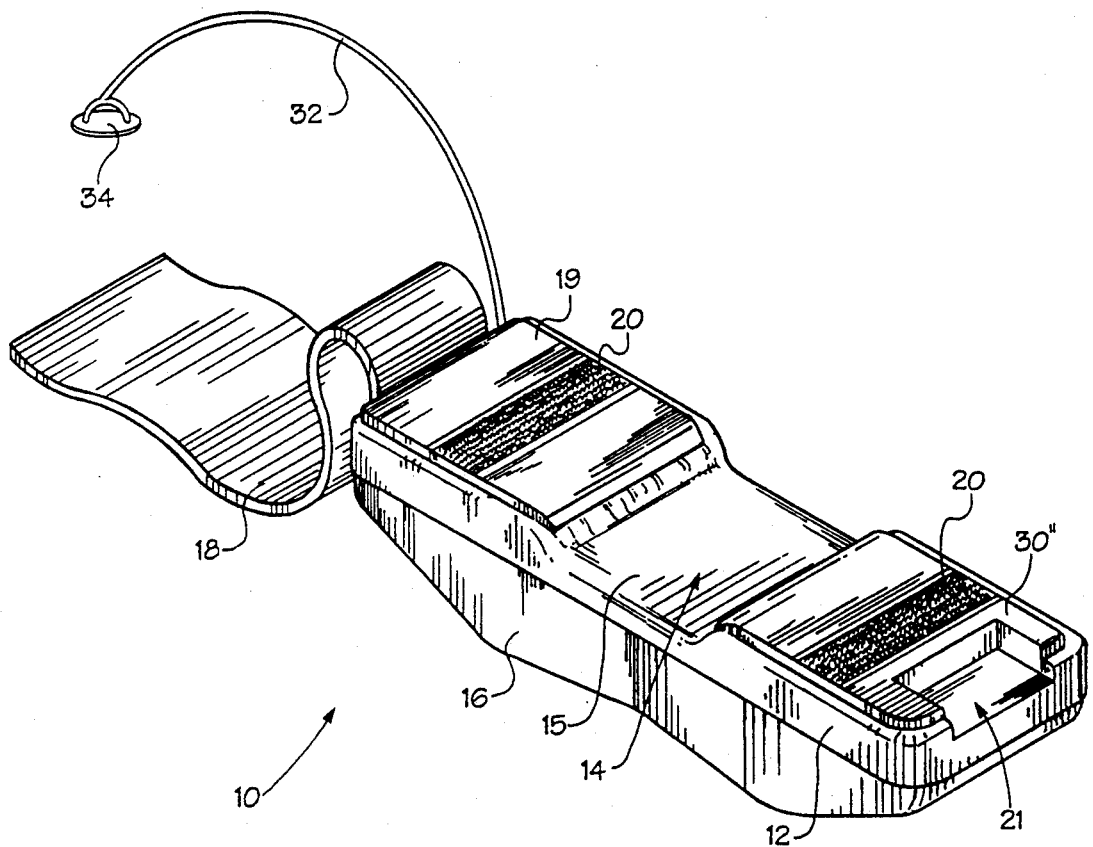
FIG. 6 is a perspective view of the shoulder protection device of the present invention according to another alternate embodiment thereof.
Figure 7:
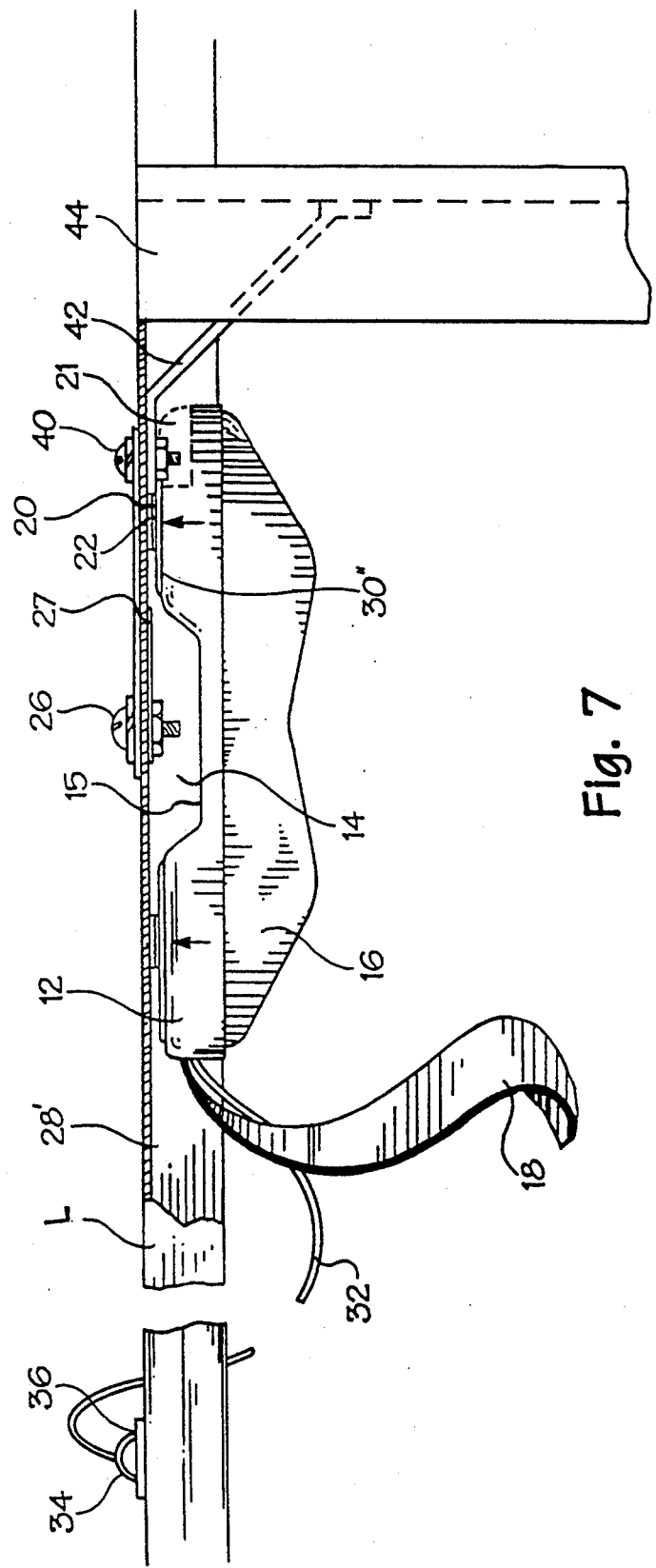
FIG. 7 is a side view of the shoulder protection device illustrated in FIG. 6 mounted in the U-shaped channel of a ladder.

Another alternate embodiment of the present invention is illustrated in FIGS. 6 and 7. As is known, some ladders have rung support braces 42 which are typically angled members attached to the bottom of a rung 44 and to the inside of the U-shaped channel 28' using a conventional nut, bolt and washer assembly 40. (See FIG. 7.) The rung brace 42 and associated mounting hardware 40 may interfere with placement of the shoulder protection device 10 within the U shaped channel 28'. Accordingly, and with reference to FIG. 6, the shoulder protection device 10 may include a recess 21 formed in one of the mounting members 30'', and extending partially thereinto in a generally parallel relation with the body 12 of the device 10. Therefore, when the device 10 is mounted in a U shaped channel 28' having a rung brace 42, a portion of the rung brace 42 and its associated nut, bolt and washer assembly 40 fits within the recess 21, allowing the device 10 to be mounted as previously described. However, the Velcro ® fastener portion 20 and its associated well 19 must be relocated to a position on the mounting member 30'' adjacent the first recess 14, intermediate the first recess 14 and the second recess 21. It should be understood that, although not illustrated, a recess may be formed in the mounting member 30' of increased height (see FIG. 5) in the manner previously described should it be necessary.

The features of the present invention provide enhanced comfort and stability when carrying a ladder on one's shoulder. In addition, the present invention is readily adaptable for use on various types of ladders, and by users having either left hand or right hand orientation.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A shoulder protection device for mounting to a ladder having legs formed of generally U-shaped channels to provide support during shoulder supported transportation thereof, said shoulder protection device comprising a body configured for mounting insertion within the U-shaped channel, said body having a first surface for mounting contact with the U-shaped channel, a second surface projecting beyond the edges of the U-shaped channel for contact with the shoulder of a user; mounting means affixed to said first surface for releasably mounting said device within the U-shaped channel; and recess means formed in said first surface extending transversely across the width of the U-shaped channel when said device is mounted therein for mounting said device in ladders having pivoted cross-brace construction, said recess means being of sufficient depth to accommodate said cross-brace and associated hardware.

2. A shoulder protection device for ladder support according to claim 1 wherein said mounting means includes at least one mounting member projecting outwardly adjacent said recess means, and fastener means affixed to said at least one mounting member for releasably mounting said device in said U-shaped channel.

3. A shoulder protection device for ladder support according to claim 2 wherein said at least one mounting member includes a second recess formed therein adjacent said fastener means and extending in a generally parallel orientation with said body for accommodation of rung braces and mounting hardware associated therewith.

4. A shoulder protection device for ladder support according to claim 1 and further comprising a plurality of shim means of graduated thicknesses for mounting between said first surface and said U-shaped channel for mounting said device on ladders having different U-shaped channel depths to ensure that a portion of said second surface projects beyond the edges of the U-shaped channel and to vary the depth of said recess means to accommodate cross-brace constructions of various sizes.

5. A shoulder protection device for ladder support according to claim 1 and further comprising garment protection means attached to said body and projecting outwardly therefrom and formed to extend intermediate the clothing of a user and a portion of the ladder being carried to prevent the user's clothing from becoming soiled or torn due to contact with said ladder portion.

6. A shoulder protection device for ladder support according to claim 1 and further comprising tether means affixed to said body of said device and releasably mountable to the ladder to prevent said device from becoming disassociated from the ladder when said device is not disposed within the U-shaped channel.

7. A shoulder protection device for ladder support according to claim 6 wherein said tether means is an elongate, flexible strand.

8. A shoulder protection device for ladder support according to claim 1 and further comprising storage means attached to said ladder on an outside surface of the U-shaped channel and cooperative with said mounting means for securing said device in a position on the outside surface of the U-shaped channel for storage of said device when the device is not disposed in the U-shaped channel.

9. A shoulder protection device for mounting to a ladder having legs formed of generally U-shaped channels to provide support during shoulder supported transportation thereof, said shoulder protection device comprising a body configured for mounting insertion within the U-shaped channel, said body having a first surface for mounting contact with the U-shaped channel, and a second surface projecting beyond the edges of the U-shaped channel for contact with the shoulder of a user; mounting means affixed to said first surface for releasably mounting said device within the U-shaped channel; and a plurality of shim means of graduated thicknesses for selective mounting at spaced locations between said first surface and the U-shaped channel for forming a variable recess therebetween and increasing the depth of said device to permit mounting said device on ladders having U-shaped channels of different depths and to ensure that a portion of said second surface projects beyond the edges of the U-shaped channel and to permit said recess means to accommodate ladder cross-brace constructions of various sizes.

10. A shoulder protection device for ladder support according to claim 9 wherein a fixed recess is formed in said first surface and extends transversely across the U-shaped channel when mounted therein to cooperate with said variable recess for mounting said device in ladders having varying cross-brace constructions.

11. A shoulder protection device for ladder support according to claim 9 wherein said mounting means includes at least one mounting member projecting outwardly from said first surface and fastener means affixed thereto for releasably mounting said device in said U shaped channel.

12. A shoulder protection device for ladder support according to claim 11 wherein said fastener means includes a two-portion hook and loop fastener having a first portion attached to said mounting member and a second portion attached to said U-shaped channel thereby allowing said device to be releasably mounted within said U-shaped channel.

13. A shoulder protection device for ladder support according to claim 9 and further comprising garment protection means attached to said body and projecting outwardly therefrom and formed to extend intermediate the clothing of a user and a portion of the ladder being carried to prevent the user's clothing from becoming soiled due to contact with said ladder portion.

14. A shoulder protection device for ladder support according to claim 9 and further comprising tether means affixed to said body of said device and releasably mountable to the ladder to prevent said device from becoming disassociated with the ladder when said device is not disposed within the U-shaped channel.

15. A shoulder protection device for ladder support according to claim 14 wherein said tether means is an elongate, flexible strand.

16. A shoulder protection device for ladder support according to claim 9 and further comprising storage means attached to said ladder on an outside surface of the U-shaped channel and cooperative with said mounting means for securing said device in a position on an outside surface of the U-shaped channel for storage of said device when the device is not disposed in the U-shaped channel.

17. A shoulder protection- device for mounting to a ladder having legs formed of generally U-shaped channels to provide support during shoulder supported transportation thereof, said shoulder protection device comprising a body configured for mounting insertion within the U-shaped channel, said body having a first surface for mounting contact with the U-shaped channel and a second surface projecting beyond the edges of the U-shaped channel for contact with the shoulder of a user; recess means formed in said first surface extending transversely across the width of the U-shaped channel when said device is mounted therein for mounting said device in ladders having pivoted cross-brace construction, said recess means being of sufficient depth to accommodate said cross-brace; mounting means affixed to said first surface including at least one mounting member projecting outwardly adjacent said recess means and fastener means affixed to said mounting member, said fastener means including a two portion hook and loop fastener having a first portion attached to said mounting member and a second portion attached to said U-shaped channel for releasably mounting said device within the U-shaped channel; and shim means of graduated thicknesses for selectively mounting intermediate said first surface and said U-shaped channel for forming a variable recess therebetween and varying the depth of said device to permit mounting said device on ladders having U-shaped channels of different depths and to ensure that a portion of said second surface projects beyond the edges of the U-shaped channel and to vary the depth of said recess means to permit said recess means to accommodate ladder cross-brace constructions of various sizes.

* * * * *